July 6, 1965  R. D. PORTER ETAL  3,192,988
FUEL CONTROL WITH PRESSURE CONTROL MEANS
Original Filed June 3, 1960  3 Sheets-Sheet 3
FIG. 3
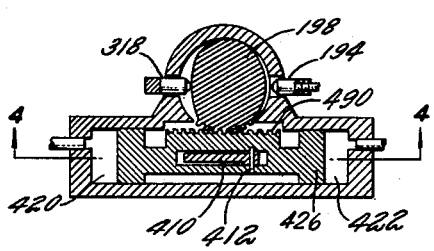
FIG. 4
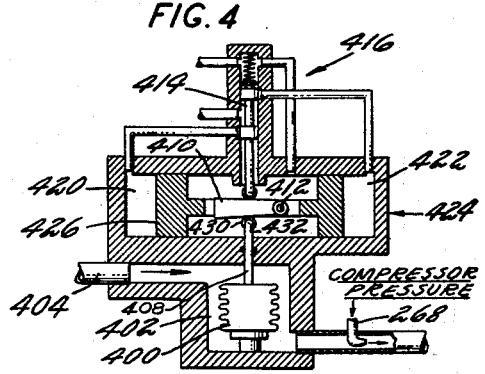
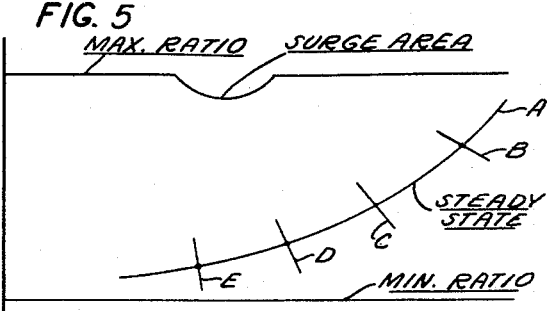
INVENTORS
ROBERT D. PORTER
CHARLES F. STEARNS
BY Norman Friedland
ATTORNEY 3,192,988
FUEL CONTROL WITH PRESSURE CONTROL MEANS
Robert D. Porter, Simsbury, Conn., and Charles F. Stearns, East Longmeadow, Mass., assignors to United Aircraft Corporation, East Hartford, Conn., a corporation of Delaware
Original application June 3, 1960, Ser. No. 33,822. Divided and this application Sept. 11, 1962, Ser. No. 223,308
5 Claims. (Cl. 158—36.4)

This is a divisional application of application Serial No. 33,822 filed on June 3, 1960, entitled "Fuel Control" by Robert D. Porter et al., now abandoned.

This invention relates to fuel controls and more specifically to a fuel control for a gas turbine engine.

The type of fuel control to be described herein is a modification of the type shown in Patent No. 2,822,666 issued on February 11, 1958, entitled Turbine Power Plant Fuel Control Utilizing Speed, Temperature and Compressor Pressure by S. G. Best, and reflects an improvement thereof. In the foregoing patent, for example, a separate speed-sensing device has been employed to give acceleration schedule and another speed-sensing device for steady state engine operating conditions. In the present invention a number of servo devices and mechanical connections have been eliminated providing a simplified and less expensive fuel control which has been made possible because of the arrangement and improvement afforded by novel features incorporated in this fuel control. The advantages which will become more apparent have been achieved without sacrificing accuracy, reliability and functionality of the fuel control all being essential factors for proper engine operation. As it is generally well-known, fuel controls of this type have been "tailor made" to fit a particular engine. That is to say, a control designed for an engine manufactured by one concern would not be readily adaptable to an engine manufactured by another concern and even different engines manufactured by the same concern would not lend themselves for adaptation by the same control. In this regard, the flexibility obtainable by the arrangement of these parts has made this control adaptable to a number of engines so long as the physical envelope is susceptible for such adaptation. This is made possible without incurring a costly redesign of these controls which has heretofore been the practice employed throughout the industry.

It is an object of this invention to provide means for bypassing fuel around the throttle valve through the existing pressure regulating valve in the event of a windmilling condition of a power plant.

This and other objects of this invention will become readily apparent from the following detailed description of the drawing in which:

FIG. 3 is a cross-sectional fragmentary view taken along the line 3—3 of FIG. 2.

FIG. 4 is a fragmentary cross-sectional view taken along line 4—4 of FIG. 3 and also showing diagrammatically the temperature sensing mechanism of this invention.

FIG. 5 is an illustration of engine operating curves and a random showing of a family of droop lines.

Figure 1:
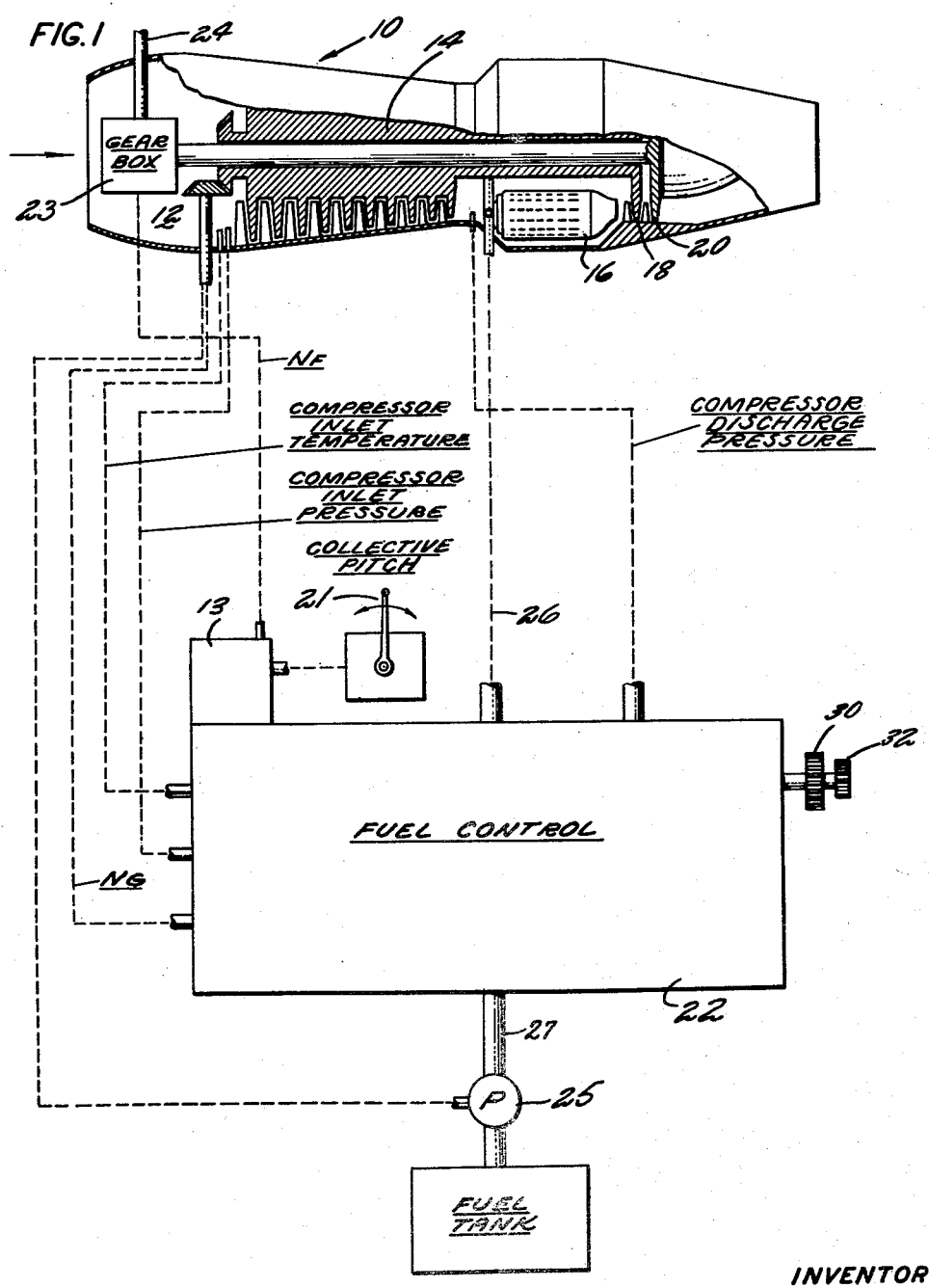
FIG. 1 is a schematic illustration of a turbo power plant showing a schematically indicated fuel control operatively connected thereto.

Referring particularly to FIG. 1, a gas turbine power plant is generally indicated at 10 comprising an air inlet 12, a compressor 14, a combustion section or burner chamber 16, a first turbine 18 and a second turbine 20. Turbine 18 is arranged to drive compressor 14 and turbine 20 is arranged to drive the gears located in gear box 23. Shaft 24 is illustrated as being driven by gear box 23 for driving a variable load as, for example, a helicopter rotor (not shown). It should be understood that a propeller can be adapted to be driven by this power plant in a manner well known in the art as, for example, connecting a propeller shaft directly to the gear box. In the case of a turbojet engine, the shaft may be connected directly to another set of compressor blades. Since, as is shown, turbine 20 is not directly connected to compressor or gas generator 14 which may be the case for the turboprop power plant and since the only connection between the first and second turbines is the fluid connection or the aerodynamic coupling, it is referred to as the free turbine, and the r.p.m. of turbine 20 and the variable load such as a helicopter rotor or propeller driven by this turbine is hereinafter referred to as ($N_f$). Since turbine 18 is mechanically connected to the compressor or gas generator 14, it is referred to as the gas generator turbine and the r.p.m. of the compressor and turbine 18 driving this compressor will hereinafter be referred to as ($N_g$). It will be understood that since both turbines are connected to the compressor in the case of a turbojet, there will be no distinction made between a gas generator turbine and a free turbine.

A better understanding of the general theory of the operation of fuel controls of this type is clearly illustrated in U.S. Patent No. 2,822,666 supra. Suffice it to say that basically, fuel control operation is a combination of metering devices and computation mechanism controlling the quantity of fuel to the engine in the amount defining a particular schedule selected to allow the engine to operate within its safe operating limits and yet provide efficient and optimum power plant operating conditions. Fundamentally, the fuel control functions to automatically adjust the quantity of fuel metered to the engine in accordance with the thrust required by the pilot (i.e. the position of the power lever) in such a manner as to provide efficient and safe engine operating conditions. By rotation of the power lever, a signal of the desired speed is fed into the governor. This signal may be biased by the compressor inlet pressure so as to obtain the optimum speed at various altitude conditions. These signals are combined into an adding bar which compares the actual speed of the compressor with the desired speed as set by the pilot lever and feeds the resultant signal into the multiplication mechanism. The desired speed, of course, may be biased by the compressor inlet pressure or temperature. The signal which is being fed into the multiplication device for convenience is considered as the multiplicand and as will be more fully explained hereinafter, this multiplicand may be modified in accordance with various engine parameters or variables in order to automatically control the engine for all operating conditions. That is to say, the fuel control must provide sufficient fuel to maintain the desired thrust yet prevent overtemperature, surge, or rich and lean blowouts (the effect of ratio of fuel to air). It is important to realize that the multiplicand is rated in terms of ratio units, that is to say, the value of this variable is in terms of the weight of the fuel per unit time divided by the compressor discharge pressure. (Other engine pressures may be used, but this one is preferred because of design considerations.) By relating all the controlling parameters or variables in this manner, it is now possible to multiply this ratio, hereinafter referred to as ($W_f/P$), by actual compressor discharge pressure (P) which in turn will give the necessary fuel flow, i.e., $W_f/P \times P = W_f$. Since the pressure drop across the throttle or metering valve is maintained at a constant value, a discreet positioning thereof will give a predetemined flow. As mentioned above, a distinct and important feature of our fuel control is the fact that by minor adjustments and modifications, the fuel control can be easily adapted for turboprop engines. As shown in FIG. 1, numeral 13 schematically illustrates the control for turboprop adaptation for both a helicopter or propeller-driven aircraft. In the case of controlling a helicopter, a collective pitch control schematically shown at numeral 21 may be employed to bias the fuel control. An explanation of collective pitch is not deemed necessary to understand this invention, but a description of a suitable collective pitch control is fully illustrated in U.S. application Serial No. 861,396, filed December 22, 1959, for Collective Pitch Bias, assigned to the same assignee now issued as U.S. Patent No. 3,034,583. For propeller application, control 13 is slightly modified so as to essentially retain the identical parts as used for helicopter application. Fuel control 22 senses the value of the same variables or parameters of power plant operation whether utilized with a turbojet or a turboprop. As shown in FIG. 1, fuel control 22 senses the ($N_g$), compressor inlet temperature, compressor inlet pressure and compressor discharge pressure. A pilot's control gears 30 and 32 are operatively connected to the fuel control 22 for proper selection of the desired speed. Fuel is pressurized by pump 25, which may be driven by compressor 14, prior to entering the fuel control which meters or regulates the quantity of fuel fed to the fuel nozzles by line 26 for engine consumption.

Figure 2:
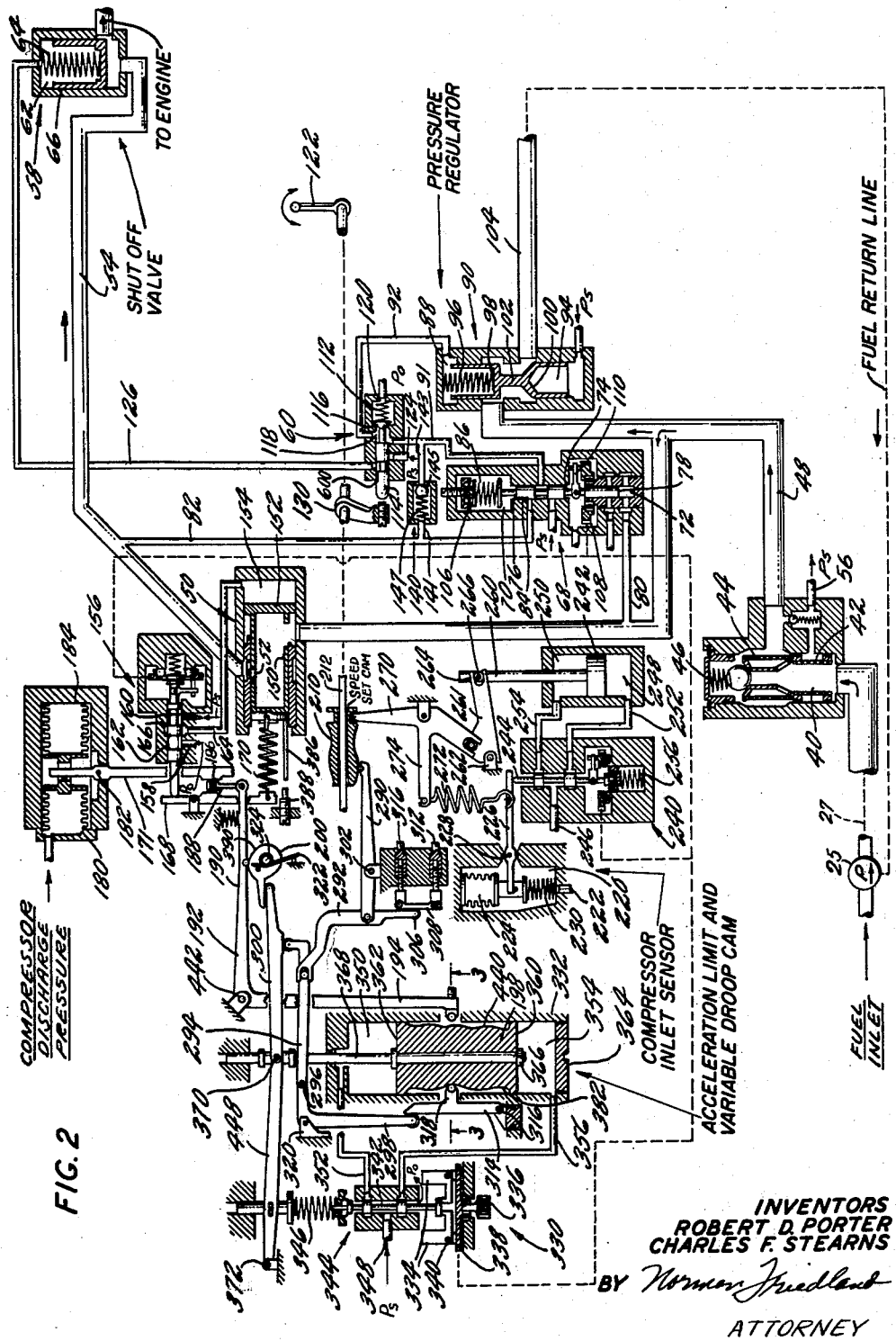
FIG. 2 is a diagrammatic illustration of the fuel control of this invention arranged for a turbojet power plant.

Referring more particularly to FIG. 2, the fuel metering system is best described as having an inlet chamber 40 which may include screens 42 and 44 which are utilized for removing foreign matter entrained in the fuel. Fuel pressurized by pump 25 is delivered to chamber 40 via line 27. Screens 42 and 44 are biased downward by spring 46 which permits the screens to unseat should the pressure in inlet chamber 40 build up as a result of the screens becoming clogged. Fuel is delivered via line 48 to the throttle valve which is generally indicated by numeral 50 and is metered or regulated through metering port 52 to the engine via line 54. In order to obtain high pressure fluid for the various servo actuating devices and controls, a connection 56 in inlet chamber 40 is provided. It is to be noted that the pressure for servo actuation is equivalent to the pressure downstream of the pump and is hereinafter referred to as $P_s$. Minimum pressurizing and shutoff valve 58 is disposed in line 54 and serves to positively block off fuel from the engine and has a dual function which is (1) to provide a minimum pressure to the control servos during initial starting and (2) to provide a positive fuel shutoff. Actuation of the minimum pressurizing and shutoff vlave 58 is controlled by a switch over or windmill bypass and shutoff control valve which is generally indicated by numeral 60 and which will be described in more detail hereinafter. Minimum pressurizing and shutoff valve 58 comprises a chamber 62, spring 64 and valve element 66. Spring 64 biases valve element 66 toward a closed position and the relative strength of this spring and the force responsive area of the valve element created by the pressure acting in chamber 62 determine the pressure in line 54 which is necessary for the opening of this valve.

The combined sensing and pressure regulating valve generally indicated by numeral 68 communicates with the upstream and downstream pressure of throttle valve 50 and serves to maintain constant the value of the pressure drop across the throttle valve. The operation of combined pressure regulating sensor and servo valve 68 is described as follows. A T-connection in line 54 leads to the valve 68 which includes chambers 70 and 72 which are separated by spool valve 74. Spool or pilot valve 74 includes on its opposite ends reaction surfaces 76 and 78 which respond to the forces created by the pressures acting in chambers 70 and 72, respectively, for movement of spood valve 74. Chamber 72 connects with the pressure upstream of throttle valve 50 via line 80 and chamber 70 connects with the pressure downstream of throttle valve 50 via line 82 and the annular opening 84. Spring 86 bases spool valve 74 in adownward direction and the relative force of the spring and force responsive areas on the opposite ends of the spool valve 74 determines the position of spool valve 74 which in turn determines the pressure in chamber 88 of the pressure regulating valve 90. The value of the spring determines the value of the pressure drop of the throttle valve. As the pressure in chamber 70 increases, spool valve 74 moves downward permitting servo pressure $P_s$ to communicate with chamber 88 via lines 91 and 92. Conversely, when pressure in chamber 70 decreases, spool valve 74 moves upward connecting chamber 88 with line 54 which is at a lower pressure than $P_s$. The pressure regulating valve 90, which may be of any suitable type, is shown as having equal area reaction surfaces 98 and 100 opposing each other so that the pressure in chamber 88 will be something less than the pressure in chamber 94 and the servo pressure in chamber 88 together with the strength of spring 96 determine the relative position of pressure regulating valve 90. For example, when the pressure in chamber 88 increases, the movable valve element or servo motor 102 will be biased toward its closed position and conversely, when the pressure in chamber 88 decreases, the pressure in chamber 94 will urge valve element or servo motor 102 to its open position. Any fuel that is bypassed by the pressure regulating valve is carried back to the inlet of the pump via line 104. Valve 68 may include a fuel temperature compensator which varies the height of spring 86 in accordance with the temperature sensitive bimetal 106. In order to obtain free movement of spool valve 74, the valve is continuously rotated by gear 108 which drives connecting link 110, pivotally connected to the spool valve 74. It will be noted that this driving mechanism will not interfere with axial movement of the spool valve.

As mentioned above, the switch-over or windmill bypass and shutoff control valve 60 serves to control the pressure in chamber 62 of minimum pressurizing and shutoff valve 58. Valve 60 comprises chamber 112 and spool valve 114. The right-hand end of the spool valve has an enlarged diameter portion 116 which seats against the inner portion on the right end of the bore 118. Spring 120 biases the spool valve to the left, and the strength of this spring and force of the reaction surface of the right end of the spool valve urge the valve toward the closed position. Upon rotation of the pilot lever 122, rotatable cam 130 engages the end of spool valve 144 and positions the spool valve 114 to the right against the spring 120 for simultaneously conducting pressure $P_s$ in line 124 to chamber 62 and connecting chamber 88 to the drain pressure via line 92 and chamber 112. (Drain pressure is the lowest pressure of the fuel in the fuel control and will be hereinafter referred to as $P_0$.) In this manner, since the pressure in chamber 88 now equals drain pressure, the valve element 102, due to the force created in chamber 94, is placed in its open position, and servo pressure being higher than the pressure in line 54 causes valve element 66 to close. This is an important feature of this invention because this provides a method for preventing the fuel pressure in the fuel control from becoming excessive which, if not controlled, would inflict structural damages to the fuel control. This condition becomes most prevalent in the event that a malfunction in the engine occurs. As will be noted, the pump is continuously driven by the compressor even when the engine is inoperative due to windmilling effect caused by the air passing over the engine's compressors. It should be noted that when spool valve 114 is moved to the right, high pressure $P_s$ is simultaneously directed to chamber 62 of valve 58 closing valve element 66 thereby blocking off fuel to the engine. By combining the shutoff valve with the windmill bypass feature, we are able to realize an efficient means for protecting the fuel control against the adverse effects created by windmilling without introducing a substantial increase in pressure drop across the fuel control which has heretofore been the situation of other windmill protection methods.

A check or relief valve 140 is connected across the pressure regulating valve sensor 68 and serves to prevent excessive fuel flow from reaching the engine in the event that the pressure regulator sensor 68 should fail. Lines 141 and 143 lead into lines 82 and 91 respectively for directing pressure across the ball 145 of check or relief valve 140. Spring 147 biases ball 145 to its closed position, and its value is slightly higher than the difference obtained by subtracting the value of spring 96 from spring 86. Thus during normal operating conditions, this valve is inoperative. However, should the pressure in line 143 exceed the force exerted by the spring 147, the flow will be shunted across valve 68 and hence, preventing the pressure in chamber 88 from increasing above this predetermined value. Operation of check valve 145 only occurs when valve 68 fails in such a position that the pressure $P_s$ is connected to line 91 so as to allow the pressure in said line to exceed the pressure in line 82. This results in preventing the pressure regulating valve 90 from shutting off and hence, causing all the flow in line 48 to be forced through valve 50. If valve 90 were to be closed in this manner, a substantial error in metered fuel would result, causing excessive damage to the engine.

The throttle valve 50 comprises a moveable valve element 150 having a piston head 152 forming one end of chamber 154. The servo pressure in chamber 154 is regulated for positioning the moveable valve element 152 which in turn defines the area of port 52 and as mentioned above, since the value of the pressure drop across this port is constant, each discreet position of the valve element 150 will deliver a predetermined quantity of fuel to the engine. The pressure in chamber 154 may be controlled by pilot valve 156. Pilot valve 156 is connected to drain pressure and high pressure via lines 158 and 160, respectively, and the relative movement of the spool valve 162 will connect the chamber 154 to either $P_s$ or $P_0$ pressure via line 164 depending whether it is moved to either the left or right. It will be noted that when the valve is in equilibrium, the port at the end of line 164 and the middle land 166 of spool 162 is on its line-on-line position. Movement of spool element 162 is imparted by multiplying linkage 168 which carries feedback spring 170 at its opposite end. The feedback spring 143 is connected to the valve element 150 for balancing out the forces on linkage 168 and nulling or balancing out the system.

The position of the multiplying linkage 168 reflects the product which resulted by multiplying the multiplicand as defined in the above by the compressor discharge pressure. A force proportional to compressor discharge pressure is applied at the free end of lever 170 and the multiplication is effected as follows. Compressor discharge pressure is admitted internally of bellows 180 which has its free end engaging the top end of arm 170 and pivots about pivot point 182. A second bellows 184 opposes the movement of bellows 180 and is evacuated so that the relative movement of arm 170 is a function of absolute pressure. Interposed between the free end of arm 170 and multiplying linkage 168 are rollers 186 which vary the lever ratio of the multiplying linkage in order to effect a multiplication of the power plant operating variables or parameters as has been described above. The relative position of the rollers, as will be apparent, can be considered as the multiplicand which is proportional to the $W_f/P$ ratio. Thus it is evident that the ratio $W_f/P$ represents or is a function of the variables or parameters of the power plant which have been selected for proper power plant operation. A preferred selection of parameters is described herein, but it is pointed out that other parameters may be similarly utilized without departing from the scope of this invention.

Still referring to FIG. 2, rollers 186 are operatively connected to gas generator speed governor, compressor inlet temperature device, compressor inlet pressure device and the power lever in the manner immediately described hereinbelow. It will be noted that this fuel control provides for acceleration scheduling by utilizing the same signal generating mechanism with the exception of the power lever and compressor inlet pressure device as is utilized for steady state operation. Therefore, during acceleration regimes, the fuel flow as will be shown is made a function of speed of the compressor and the inlet temperature of the compressor and during steady state regimes, fuel flow is made a function of compressor speed, compressor inlet temperature, compressor inlet pressure and power lever position.

Rollers 186 are attached to reciprocal arm 188 which in turn is connected to horizontal leg 190 of bell crank 192. It will be noted that the vertical arm 194 of the bell crank is shown as being out of engagement with the cam 198 while the horizontal leg 190 is in engagement with cam 200. The purpose of vertical arm 194 is to override the effect of cam 200 by lifting arm 190 off cam 200 when the lower end of arm 194 comes into contact with the three-dimensional cam 198 which occurs during the acceleration regimes. It is therefore evident that cam 200 is designed to schedule the fuel flow for steady state power plant operating conditions while the override feature just described provides a schedule for limiting fuel flow during acceleration regimes of power plant operations. The three-dimensional cam will be described in more detail hereinafter.

The method of obtaining the value of the multiplicand can best be described as follows. Rotating the power lever 122, cam 210 which is connected thereto by shaft 212 rotates correspondingly and schedules the desired speed for each discreet angle of power shaft position. Cam 210 is of the three-dimensional type which can be rotated as well as translated along shaft 212. The cam may be contoured to schedule compressor inlet pressure signal which biases the set or desired speed signal in accordance with the compressor inlet pressure sensed at the power plant. This is accomplished as follows. Compressor inlet pressure is admitted to the sealed chamber 220 via line 222 and is sensed by evacuated bellows 224 whose free end engages the left end of lever 226 which is pivotally secured to member 228. A spring 230 balances evacuated bellows 224 and in accordance with the pressure in chamber 220 contracts and expands for relative movement of lever 226. It is evident that relative movement of lever 226 is a function of the absolute pressure. Lever 226 is operatively connected to pilot valve 240 which in turn controls servo motor 242 for biasing the speed set cam. By displacing spool 244, $P_s$ pressure in line 246 is admitted to either chamber 248 or chamber 250 of the servo motor 242 via line 252 or 254. Simultaneously, the chamber which is not subjected to $P_s$ pressure is vented to drain pressure. Spring 256 balances spool 244 against the free end of arm 226. The pilot valve may be rotated in the same manner as was described in connection with the pressure regulating valve sensor 68. For convenience, the connections for rotating all of the pilot valves have been shown schematically and may be mechanically connected to speed governor 330.

As mentioned above, by actuation of pilot valve 240, servo motor 242 will make a proportionate movement causing connecting rod 260 to move upwardly or downwardly and in turn rotating linkage member 261 about its pivot point 262. The bifurcated end 264 of linkage member 261 engages roller 266 of connecting rod 260. A T-linkage 270 mechanically connects linkage member 261 to cam 210 for proportional translation of this cam in accordance with the signal generated by the movement of lever 226. Spring 272 carried on the free end of horizontal arm 274 of T-linkage 270 serves to balance the forces acting on lever 226 for nulling or balancing out the servo system. That is to say, when cam 210 is in the position corresponding to the signal produced by movement of arm 266, the lands of spool 244 will be in their line-on-line position with their cooperating ports. The left end of follower 290 is pivotally connected intermediate the ends of vertical arm 292 which is pivotally supported to the left end of horizontal lever 294 which in turn pivots around pivot connection 296 of bell crank 298. Movement is imparted to adding bar 300 by rotating lever 290 about pivot point 302 for up and down movement of vertical arm 292. It will be noted that the bottom end of vertical arm 292 carries a roller 306 which rides along the surfaces of cam 308. The relative angle that this cam makes with vertical arm 292 is adjusted by external connections 316 and 312. These adjustments function to calibrate the fuel control for different engine operation schedules.

From the foregoing, it is apparent that the position of horizontal lever 294 is proportional to the desired or set speed as scheduled by the pilot lever 122.

The set speed may be modified in accordance with compressor inlet temperature by designing a schedule in the profile of the three-dimensional cam 198. In order to build in a temperature scheduled signal for each desired speed setting, the three-dimensional cam is made to rotate and translate within its cylinder 382. The means for accomplishing rotation will be described hereinafter in connection with FIGS. 3 and 4. The method of resetting the set or desired speed in accordance with the temperature can be best explained as follows. T-linkage 314, which is pivotally supported to member 316, engages the cam by the follower arm 318. Follower arm 318 in turn transmits motion which is proportional to the profile of cam 198, to horizontal lever 294 by bell crank 298 which is pivotally supported to pivot 320. It will be noted that torsion spring 322, which engages both shaft 324 and cam 200, serves to keep the connecting members in engagement.

The purpose of adding bar 300 is to compare the desired or set speed signal with a signal proportional to the actual compressor speed and to feed to rollers 186 a signal which is proportional to the difference or error of these two signals for providing the value of the multiplicand as will be more fully described hereinbelow.

It will be noted that the position of the right-hand end of adding bar 190 is equivalent to the ratio $W_f/P$. The actual speed signal is fed into the adding bar at pivot point 370 which is positioned by the three-dimensional cam 198, which in turn is controlled by gas generator speed governor 330. In the assembly of this fuel control, the three-dimensional cam 198 is inserted into housing 332 such that each discreet axial position thereof corresponds to a definite speed value of speed governor 330. That is to say, for definite $N_g$, the three-dimensional cam 198 will be at a predetermined position. The speed governor, which is driven by the compressor in any suitable manner, has flyweights 334 rotatably connected to drive gear 336 which is attached to base 338. Flyweights 334 are pivotally supported to the base 338 and rotates about pivot point 340 as a function of the centrifugal force exerted thereon. Rotation of flyweights 334 will impart axial movement to spool 342 of pilot valve 334. Spring 346 serves to balance spool 342 against the force exerted by flyweights 344. When the speed governor senses an overspeed, for example, centrifugal force causes the flyweights to upset the balance exerted by spring 346 as a result of the flyweights pivoting about point 340, and forces spool valve 342 in an upward direction. This connects $P_s$ pressure in line 348 to chamber 350 via line 352 and communicates chamber 354 with drain pressure via line 356, translating three-dimensional cam 198 in a downward direction. Conversely, during an underspeed condition, the flyweights 334 tend to pivot inwardly toward the center line of driving gear 336 allowing spool 342, under the influence of spring 346, to move downwardly. Thus, chamber 354 communicates with $P_s$ via line 356 and chamber 350 communicates with $P_0$ via line 352 causing cam 118 to move in an upward direction. This motion is transmitted to adding bar 300 at connecting point 370.

From the foregoing, it is apparent that this point represents or is a function of the actual $N_g$ and the point where horizontal lever 294 contacts bar 300 represents or is a function of the desired or set speed. When the values of these points differ, adding bar 300 is caused to rotate about pivot point 370 which in turn will cause cam 200 to rotate around shaft 324 causing the horizontal leg 190 of bell crank 192 to move in an upward or downward direction. The effect of this movement of these linkages is to feed the multiplicand signal $W_f/P$ to the rollers for multiplication by the compressor discharge pressure signal for proper positioning of throttle valve 50. The system will return to equilibrium when spring 346 is again restored to its original height by movement of feedback lever 443 which engages this spring at its left end balancing the force exerted by flyweights 334. By proper contouring of the profile of cam 200, it should be understood that a minimum $W_f/P$ ratio may be built into the fuel control (see FIG. 5). An important feature of this invention is the fact that the three-dimensional cam serves as a piston, i.e. the piston and cam are made integral. It should be noted that the working or reactive surfaces 360 and 362 are designed as piston heads of a usual double-acting piston for reciprocation in cylinder 332. The integral piston and cam 198 is particularly located in this position so that it can be easily reached from the outside of the housing of the fuel control. Cap 364 located at the bottom of cylinder 332 is threadably engageable with cylinder housing. By removing cap 364, cam 198 can be easily reached externally of the fuel control casing so that by unfastening nut 366 threaded to the bottom of connecting rod 368, cam 198 can easily be detached.

We have found that it is possible to vary the droop of the scheduled fuel flow for a given speed by superimposing on profile 382 of cam 198 a preselected droop schedule. Droop is defined, for purposes of this invention, as the rate of change of fuel flow for a unit change of speed. This can be best explained by referring to the graph of FIG. 5 which shows the $W_f/P$ ratio plotted against $N_g$. Line A represents steady state power plant operating conditions and lines B, C, D, and E represent a family of droop lines which intersect steady state line A at a point indicative of the proper steady state operating speed. The purpose of contouring the profile 382 is for varying the slope of these droop lines thus, as was mentioned above, since each position of the cam represents a particular speed, by proper modification of the cam, the slope of the droop lines can be varied as a function of speed. In this manner the engine dynamic response can be adjusted for optimum performance over a wide range of operating speeds. Should the speed, for any reason, deviate from the point represented by the intersection mode between the steady state line and droop line, the control will restore the engine to its proper operating speed by following its particular droop line.

Referring again to FIG. 2, it will be noted that the valve element 150 of throttle valve 50 carries with it an axial extension 386 which abuts against adjusting screw 388 which serves to provide an adaptable setting for the minimum flow of fuel capable of passing through the throttle valve. It is further necessary, for proper operation of the control, to provide for a minimum $W_f/P_3$ ratio which may be obtained by contouring the top surface 390 of cam 200 so that its radius of curvature becomes constant for a span where the minimum $W_f/P_3$ ratio is desired.

In order to attain rotation of the three-dimensional cam 198 in response to compressor inlet temperature, as shown in FIG. 4, a liquid-filled bellows 400 is provided in chamber 402 which is connected to the engine's compressor inlet by line 404. An ejector pump 268 may be connected to compressor discharge pressure (not shown) is disposed downstream of the bellows for inducing flow through chamber 402, assuring that the air around the bellows does not stagnate and give an inaccurate signal. Variation in bellows 400 causes rod 408 attached to its free end to move up or down which in turn causes cam 410 to pivot about shaft 412 for corresponding movement of spool valve 414 of pilot valve 416. Movement of the spool 414 connects pressure reacting chambers 420 and chamber 422 of servo motor 424 to either $P_0$ or $P_s$ pressure. Variation of pressures in chambers 422 or 424 will cause the piston 426 to move either to the left or to the right. An important feature of this invention is the manner in which the cam is arranged with its cooperating parts which provides a simplified method for nulling or balancing out the effect of the temperature signal. It will be noted that as the piston 426 translates, the bottom surface of cam 410 presses against roller 430 which is pivotally secured to arm 432. This provides a feedback signal to the pilot valve for nulling out or restoring the system back to equilibrium. Because of this particular arrangement, the profile of the bottom of cam 410 may easily take any shape thus providing means for imparting a linear or nonlinear output signal as may be desired. As shown in FIG. 3, piston 426 of servo motor 424 carries a rack gear 490 which engages with the gears located on the bottom of three-dimensional cam 198 for rotation thereof. It will be noted that the teeth on three-dimensional cam 198 span a circumferential distance which is sufficient to keep the teeth in engagement with the teeth 490 of piston 426 throughout the length of travel thereof.

*Operation*

Upon rotation of the pilot lever 122 for initial starting, cam 130 allows spool valve 114 of windmill bypass and shutoff valve 60 to move to the left by virtue of spring 120 and hence simultaneously connects chamber 62 of minimum pressurizing and shutoff valve 58 to drain pressure via the annular groove 600 formed in spool 114 and putting chamber 88 of pressure regulating valve 90 in communication with the pressure in line 54 via lines 82, 91 and 92. It will be appreciated that valve 60 is surrounded by fluid whose pressure equals the drain pressure. When the pressure in line 54 increases to a value above both the drain pressure and the force exerted by spring 64 in chamber 62, the shutoff valve 58 will open allowing fuel to be ejected into the engine. Simultaneous with this movement, three-dimensional cam 210 sets the position of horizontal arm 294 to the desired speed setting. This in turn causes adding bar 300 to rotate about pivot 370 which in turn forces the right-hand end of adding bar 300 to engage with cam 200 for rotation thereof which adjusts the height of the horizontal leg 190 of bell crank 194 for setting the position of rollers 186. The rollers in turn press against both multiplying link 168 and lever 171 for relative movement of pilot valve 156 for controlling the pressure in chamber 154 for positioning throttle valve 50 and hence meter the proper quantity of fuel to the engine. Since the rollers represent the $W_f/P$ ratio which is the multiplicand and since lever 171 is a function of compressor discharge measure it is evident that the formula $$W_f/P \times P = W_f$$

is satisfied.

It should be noted that an acceleration schedule may be incorporated in this control and is scheduled by the proper contouring of profile 440 of cam 198. Since this cam translates and rotates as a function of both compressor inlet temperature and compressor speed, the acceleration schedule will therefore be a function of both speed and temperature. Should the engine go beyond the temperature or speed which is predetermined by three-dimensional cam, arm 194 will engage the cam causing bell crank 192 to pivot about point 442 which in turn lifts the horizontal leg 190 of bell crank 192 off of the steady state cam 200 for repositioning rollers 186 which in turn adjust throttle valve in the manner described in the above for decreasing the quantity of fuel delivered to the engine. As the engine speed increases to the desired speed, adding bar 300 through the linkage 448 will reset the height of spring 346 so as to balance the forces exerted by the fly-weights 334 in order to maintain steady state operations. The selected engine parameters will continuosly scrutinize engine operating conditions for continuously maintaining the proper $W_f/P$ ratio.

In the event of a malfunction during flight of the aircraft wherein it is necessary to cut off fuel flow to the engine, the pilot moves lever 122 to the sut-off position. This causes the abutment on the lower end of lever 130 to actuate switchover valve 60 for simultaneously directing high pressure fluid to shut-off 58 to urge it to the closed position and dumping fluid pressure in the pressure regulating valve 90 to drain, to urge it to the full open position. Hence, the fuel normally directed to throttle valve 50 is by-passed back to the inlet of pump 25.

This prevents fuel pressure within the fuel control to build up beyond the structural integrity of the control elements which rise in pressure is occasioned by pump 25 which is driven by the engine. Of course, the engine will be at this time windmilling by virtue of the compressor blades being in contact with the airstream.

It should be understood that the invention is not limited to the particular embodiments shown and described herein, but that various changes and modifications may be made without departing from the spirit or scope of this novel concept as defined by the following claims.

We claim:

1. In a fuel control for a turbine type power plant having a combustion section, a pump driven by said power plant for pressurizing fuel, passage means connecting the discharge end of said pump to said combustion section, a throttle valve located in said passage means in combination with a shutoff valve in said passage means downstream from said throttle valve, a fluid pressure regulating control system comprising a regulating valve having connection means for bypassing said throttle valve, a servo device having fluid connecting means for controlling said regulating valve, said servo device including pilot valve means for sensing the pressure upstream and downstream of the throttle valve, the improvement comprising a switch-over valve located between said last mentioned means and said regulating valve and connected in series relation therewith, additional passage means interconnecting said shutoff valve and said switchover valve and means for positioning said switch-over valve to disconnect said pilot valve means from said regulating valve and connect it to the inlet end of said pump for permitting said regulating valve to bypass all the fuel in said passage means around said throttle valve, and simultaneously connect said shutoff valve to the discharge end of the pump for blocking off fluid flowing to the power plant.

2. In a fuel control as claimed in claim 1 including a pilot lever operatively connected to said switch-over valve to position said valve to disconnect said servo device from said bypass valve.

3. In a fuel control as claimed in claim 1 wherein said servo device comprises a ported sleeve, an elongated spool member cooperating with said sleeve for conducting fluid to and from said regulating valve, and means for imparting rotary movement to said spool member.

4. In a fuel control as claimed in claim 1 wherein said servo device controls said regulating valve to maintain the pressure drop across said throttle valve at a constant value.

5. In a turbine type power plant having a fuel control, a pump drivingly connected to said power plant for pressurizing fluid, means defining a passage for transmitting said fluid from said pump to said power plant, a throttle valve and shut-off valve disposed therein, means for maintaining constant the value of the pressure drop across said throttle valve, said maintaining comprising a servo system having a pressure regulating valve and a pilot valve having a pair of opposing fluid reaction surfaces for controlling said regulating valve, a second passage cooperating with said regulating valve for bypassing fluid from said throttle valve, a first and second conduit connecting said opposing fluid reaction surfaces of said pilot valve to the upstream and downstream side of said throttle valve, a third conduit connecting said pilot valve to said pressure regulating valve, the improvement comprising a switch-over valve disposed therein, said switch-over valve having a movable element and a spring urging said element in one direction, a movable abutment normally in out-of-engagement relationship with said element, means for engaging said abutment for urging said element in an opposite direction for disconnecting said regulating valve from said pilot valve and connect said regulating valve to the inlet of said pump and simultaneously connect said shut-off means to the discharge end of the pump whereby said pressure regulating valve moves to permit substantially all the fluid to bypass said throttle valve.

References Cited by the Examiner

UNITED STATES PATENTS

| | | | |
|---|---|---|---|
| 2,297,213 | 9/42 | Gosslad et al. | 121—41 |
| 2,470,566 | 5/49 | MacConnel | 121—147 |
| 2,643,055 | 6/53 | Sorteberg | 137—85 |
| 2,765,800 | 10/56 | Drake | 158—36.4 |
| 2,816,562 | 12/57 | Dyson | 137—85 |
| 2,822,666 | 2/58 | Best | 60—39.28 |
| 2,867,233 | 1/59 | Adelson | 121—41 |
| 2,957,488 | 10/60 | Farkas | 137—117 |
| 2,980,069 | 4/61 | Hilker et al. | 121—41 |
| 3,106,934 | 10/63 | Rogers et al. | 137—117 |

FOREIGN PATENTS

| | | |
|---|---|---|
| 387,567 | 2/33 | Great Britain. |

FREDERICK L. MATTESON, Jr., *Primary Examiner.*

KARL J. ALBRECHT, MEYER PERLIN, JAMES W. WESTHAVER, *Examiners.*

UNITED STATES PATENT OFFICE
CERTIFICATE OF CORRECTION

Patent No. 3,192,988                 July 6, 1965

Robert D. Porter et al.

It is hereby certified that error appears in the above numbered patent requiring correction and that the said Letters Patent should read as corrected below.

Column 11, line 5, after "maintaining" insert -- means --.

Signed and sealed this 30th day of November 1965.

(SEAL)
Attest:

ERNEST W. SWIDER                     EDWARD J. BRENNER
Attesting Officer                     Commissioner of Patents